(12) United States Patent
Schäfert et al.

(10) Patent No.: US 6,842,970 B2
(45) Date of Patent: Jan. 18, 2005

(54) METHOD OF PRODUCING A STRAIN-SENSITIVE RESISTOR

(75) Inventors: Arthur Schäfert, Schwalbach (DE); Jürgen Irion, Sulzbach (DE); Zlatko Penzar, Dietzenbach (DE); Wolfgang Porth, Frankfurt (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 10/288,882

(22) Filed: Nov. 6, 2002

(65) Prior Publication Data

US 2003/0062982 A1 Apr. 3, 2003

Related U.S. Application Data

(62) Division of application No. 09/647,424, filed as application No. PCT/EP99/02207 on Mar. 31, 1999, now Pat. No. 6,512,445.

(30) Foreign Application Priority Data

Mar. 31, 1998 (DE) .......................................... 198 14 261

(51) Int. Cl.[7] .............................................. H01C 17/28
(52) U.S. Cl. ...................... 29/621.1; 29/610.1; 29/620; 29/621; 29/832; 338/2
(58) Field of Search ............................... 29/610.1, 616, 29/619–620, 621, 621.1, 831, 832; 73/862.629, 862.634; 338/2, 5, 6

(56) References Cited

U.S. PATENT DOCUMENTS

| 4,367,656 A | * | 1/1983 | Fritsch | 73/862.632 |
|---|---|---|---|---|
| 4,511,877 A | * | 4/1985 | Nishikawa et al. | 29/621.1 |
| 4,633,721 A | * | 1/1987 | Nishiyama | 73/862.628 |
| 4,977,775 A | | 12/1990 | Grabovac | 73/1 |
| 5,230,252 A | | 7/1993 | O'Brien et al. | 73/862.637 |
| 5,242,722 A | | 9/1993 | Hiraka et al. | 428/34.6 |
| 5,349,746 A | * | 9/1994 | Gruenwald et al. | 29/620 |
| 5,539,158 A | * | 7/1996 | Utsunomiya et al. | 177/211 |
| 5,898,359 A | * | 4/1999 | Ellis | 338/47 |

FOREIGN PATENT DOCUMENTS

| DE | 29 48 774 | 6/1980 | ............. G01L/5/00 |
|---|---|---|---|
| DE | 35 28 364 | 2/1987 | ............. G01L/3/10 |
| DE | 40 09 286 | 9/1991 | ............. G01L/3/10 |
| DE | 40 14 511 | 11/1991 | ............. G01L/3/10 |
| EP | 0 570 066 | 5/1993 | ............. G01L/3/10 |
| EP | 0 921 384 | 11/1998 | ............. G01L/1/22 |
| GB | 2 234 629 | 2/1991 | ............. G01L/1/22 |
| WO | WO 9922210 A | * 10/1998 | |

OTHER PUBLICATIONS

Sov. Illustr. A41 (11/77) SU–R1 p. 32.

* cited by examiner

*Primary Examiner*—Peter Vo
*Assistant Examiner*—Donghai D. Nguyen
(74) *Attorney, Agent, or Firm*—Cohen, Pontani, Lieberman & Pavane

(57) ABSTRACT

A method of producing a strain sensitive resistor includes matching an area of a film insulating layer to a shape of a recess in a surface of a support element. The film insulating area is applied to the support element so that the area of the film matching the shape of the recess is congruent with the shape of the recess. A resistive layer comprising strain-sensitive resistors is applied to the film insulating layer and the film insulating layer and the resistive layer are applied to heat treatment.

2 Claims, 3 Drawing Sheets

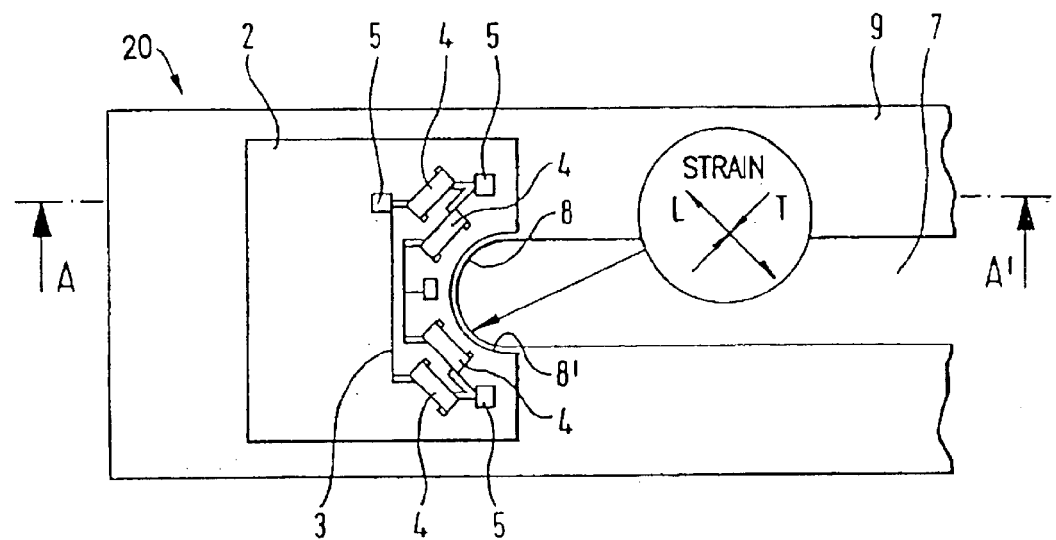
Fig.1
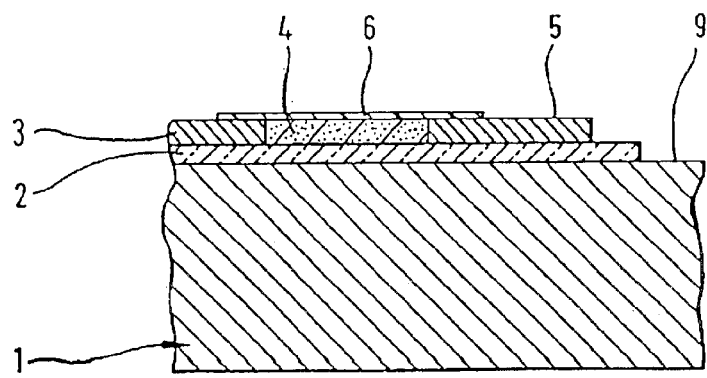
Fig.2 (A-A')

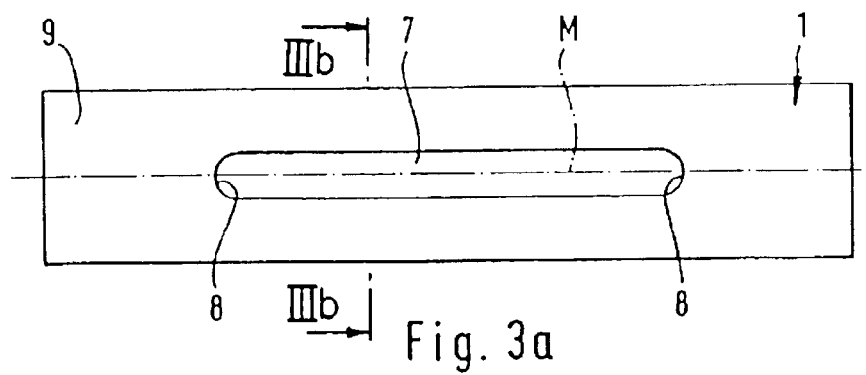
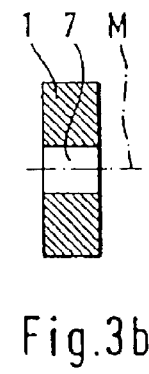
Fig. 3a     Fig. 3b
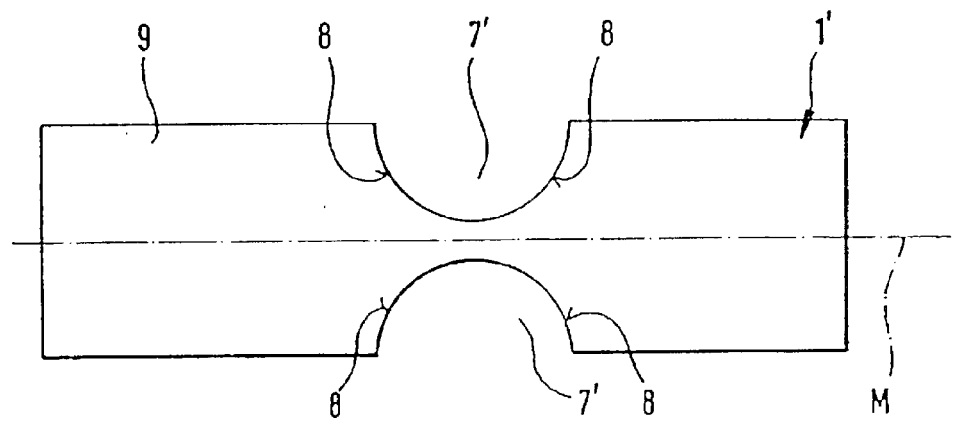
Fig. 4
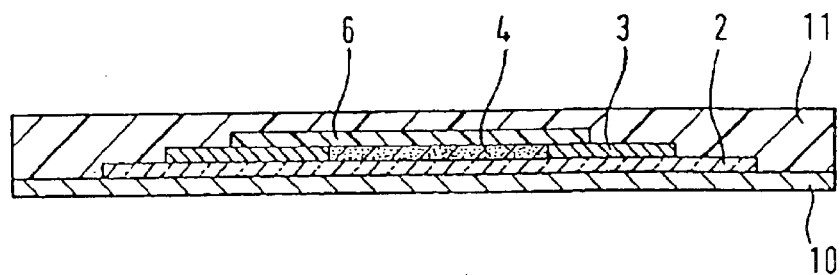
Fig. 5

METHOD OF PRODUCING A STRAIN-SENSITIVE RESISTOR

CROSS-REFERENCE TO RELATED APPLICATION(S)

This application is a Divisional of U.S. patent application Ser. No. 09/647,424, filed Nov. 30, 2000, now U.S. Pat. No. 6,512,445, which is a § 371 of PCT/EP99/02207, filed Mar. 31, 1999, which claims priority to corresponding application filed in Germany, No. 198 14 261.7, Mar. 31, 1998.

BACKGROUND OF THE INVENTION

1. Field of the Invention

The invention relates to a strain-sensitive resistor comprising a resistance layer arranged on a support element and an electromechanical transducer produced with this resistor.

2. Description of the Prior Art

The as yet unpublished German patent application 197 47 001.7 discloses a strain-sensitive resistor in which the resistor is arranged on a shaft constructed as a support element. The shaft is subjected to mechanical loading, the surface strain resulting from this being picked off by the strain-sensitive resistor arranged on this shaft without any intermediate support. The resistance layer is applied to the shaft in the form of a resistive paste, using a printing technique, and intimately connected to said shaft after a heat treatment.

In the event of torsion of the shaft, two main strains at 45° are formed on the surface of the shaft. These strains are evaluated in order to determine the torque. In this case, the main strains have the same magnitude but the opposite sign.

The thick-film resistance pastes used have positive strain factors (K factors) both for the longitudinal and for the transverse strains, for which reason only the difference of these two factors can be used to determine the effective resistance change. The signal voltages registered as the torque sensor are therefore very low and must be amplified by a comprehensive electrical arrangement, as a result of which the influence of interference on the small measured signal is increased.

SUMMARY OF THE INVENTION

An object of the present invention is to specify a strain-sensitive resistor in which an increase in the measured signal picked off across the resistor can be implemented in a simple way.

According to the present invention, the object is achieved by a support element having a recess on its surface which, when the support element is subjected to mechanical stress in at least one area of the surface of the support element in which the resistance layer is positioned, produces a ratio between the two main strains in the resistance layer which differs in magnitude.

The advantage of the invention resides in the fact that the signal response of the sensor is increased simply, without any complex change to the shaft geometry. Such a sensor is suitable for mass production, since it car be produced cost-effectively and quickly.

Because of the recess, the mechanical stresses acting on the support element, such as torsion and flexure, are superimposed, the strains in the main directions (longitudinal, transverse) having unequal magnitudes.

This recess can be produced by changes which can be implemented simply on the support element, such as drilled holes, notches and slits, so that the two main strain directions on the surface of the support element on account of torsions no longer have the same magnitudes.

The recess is advantageously formed as a continuous opening in the support element.

In one embodiment, the opening is formed as a slot, the resistance layer being arranged in the vicinity of the radial area of the slot.

The strain-sensitive resistor can be produced particularly simply if the resistance layer is arranged on a planar surface of the support element.

If the support element of the resistance layer at the some time constitutes the component to be stressed mechanically by torsion, it is possible to dispense with an intermediate support between the strain-sensitive resistor and the component to be loaded. The mechanical loading to be detected is in this case picked off directly from the component to be loaded, without signal distortions produced by the intermediate support being produced. Such a resistor reduces the production costs considerably.

A reliable, nondetachable connection is achieved if the component to be loaded mechanically and the resistance layer are connected to each other via an intimate connection, for example are sintered. This is achieved by the paste-like resistance layer applied to the support element by a printing technique being sintered to the mechanical component during a high-temperature process.

In a further embodiment, the support element is electrically conductive, an insulating layer being arranged between the resistance layer and the support element. Such a configuration is particularly practical if the component to be loaded mechanically consists of metal, such as is the case, for example, when it is used a torque sensor in power steering systems. In this way, short circuits on the sensor can reliably be prevented.

In a refinement, the insulating layer is paste-like and is applied to the support element before the application of the resistance layer, in a self-contained high-temperature process, or together with the resistance layer, during a high-temperature process.

As an alternative to this, the insulating layer, as described, is sintered to the support element, either independently or together with the resistance layer, if the insulating layer is film-like.

In this case, the insulating layer enters into an intimate connection with the component to be loaded. This connection can be implemented by a reliable process and is extremely stable in the long term.

In particular, the production of the strain-sensitive resistance with a film-like insulation layer permits the application of the strain gage to a component with a nonplanar surface.

In a method of producing the strain-sensitive resistor in which the insulating layer and the resistance layer are applied to the support element one after another, the film-like insulating layer bearing the resistance layer in at least one area is approximately matched to the shape of the recess in the surface of the support element, this area being applied to the surface of the support element so as to conform with this shape of the recess and subsequently being subjected to the action of heat.

This has the advantage that the insulating layer is used as an adjustment aid at the same time during the subsequent application of the resistor structure to the support element, and it is therefore ensured that the resistance layer is arranged in that area of the support element where the greatest difference occurs between the longitudinal and transverse strain.

In a further embodiment of the invention, the insulating layer and/or the resistance layer are first arranged on a support sheet. The side of the support sheet that bears the insulating and/or resistance layer is then covered with a flexible film layer, whose adhesion to the insulating layer and/or resistance layer is greater than the adhesion of the support sheet to the insulating layer and/or resistance layer. At, least one area of the film layer being matched to the shape of the recess in the surface of the support element. The film layer with the insulating layer and/or resistance layer is applied to the support element in such a way that the correspondingly shaped areas of the recess and the film layer are aligned congruently, the support element subsequently being subjected to the action of heat to burn out the film layer and sinter on the insulating layer and/or resistance layer.

The advantage of the invention resides in the fact that the existing structure is produced on a support material in the form of the support sheet and, after production, is placed on the support element with the aid of the transport film in the manner of a transfer. In this case, too, the shape of the transport film makes the adjustment of this arrangement on the support element easier. On the basis of this procedure, the desired layer structure can be transferred onto any conceivable geometric shape of the support element and can be sintered to form a firmly adhering layer during the subsequent heat treatment.

In this design, both the insulating layer and the resistance layer are arranged on a single support sheet and are transported with only one film layer.

In this way, a resistor is produced which adheres reliably to nonplanar surfaces of support elements, even under long-lasting mechanical and thermal loading. This is advantageous in particular when the support element, is a component to be loaded mechanically, to which layers are applied by sintering.

The insulating layer and/or the resistance layer are advantageously applied to the support sheet by a printing technique and dried. It is therefore possible not only to apply simple unstructured layers but also structured structures such as entire resistance networks to a nonplanar surface of a support element.

Using such a production method, it is possible to produce rolling structures which have dimensions determined by a computer and which are given their necessary geometric structure and dimensions only when applied to the nonplanar surface.

In one configuration, the insulating layer is printed onto the support sheet in the form of a glass frit. After the glass frit has been dried, a conductive paste is applied to the insulating layer as the resistance layer and dried, the film layer then being applied in the form of a synthetic resin film.

As an alternative to this, an insulating layer arranged on a first carrier sheet and dried is applied to the support element by means of the film layer and subjected to the action of heat. The resistance layer, printed onto a second support sheet and dried, is then positioned on the already heat-treated insulating layer with the aid of a second film layer arranged on said resistance layer and is then likewise heat-treated, The method has the advantage that, depending on the application, both the entire structure can be produced on a support sheet and, by means of a single film layer, can be transported from the support sheet to the support element, or else each layer of the structure is produced individually on a support sheet. The individually produced layer is likewise positioned on the support element by means of a film.

In another embodiment of the invention, an electromechanical transducer has a device with strain-sensitive resistors which comprises a resistance layer arranged on a common support element. The resistance layer and the support element are separated by an insulating layer and it is possible for an electrical signal corresponding to the strain to be picked up across the resistors. In this case, evaluation electronics for the electrical signal corresponding to the strain are arranged on the support element. The support element additionally has a recess on its surface which, when the support element is subjected to mechanical stress in at least one area of the surface of the support element, in which at least one strain-sensitive resistor is positioned, produces a ratio between longitudinal and transverse strain which differs in magnitude.

The invention has the advantage that both the sensor element and the sensor electronics are applied directly to the component to be loaded mechanically.

In a refined embodiment, the strain gages and the structure of the evaluation electronics, such as conductor tracks, contact points, thick-film resistors, are arranged on a common, film-like insulating layer, which is then centered jointly onto the component to be loaded mechanically.

This production of sensor element and sensor electronics even permits arrangement on components which do not have a planar surface, for example on round components.

BRIEF DESCRIPTION OF THE DRAWINGS

The invention permits numerous embodiments. One of these is to be explained in more detail using figures illustrated in the drawing and in which:

FIG. 1 is a schematic diagram of a torque sensor according to the present invention.

FIG. 2 is a sectional view of a strain gage according to the present invention along line A–A' in FIG. 1;

FIG. 3a is a plan view of a first support element configured according to the present invention;

FIG. 3b is a cross section of the support element along the line IIIB—IIIB in FIG. 3a;

FIG. 4 is a plan view of a second support element configured according to the present invention;

FIG. 5 is a cross sectional view of a strain-sensitive measurement resistor arranged on a support sheet;

DETAILED DESCRIPTION OF THE PREFERRED EMBODIMENT

Figure 6:
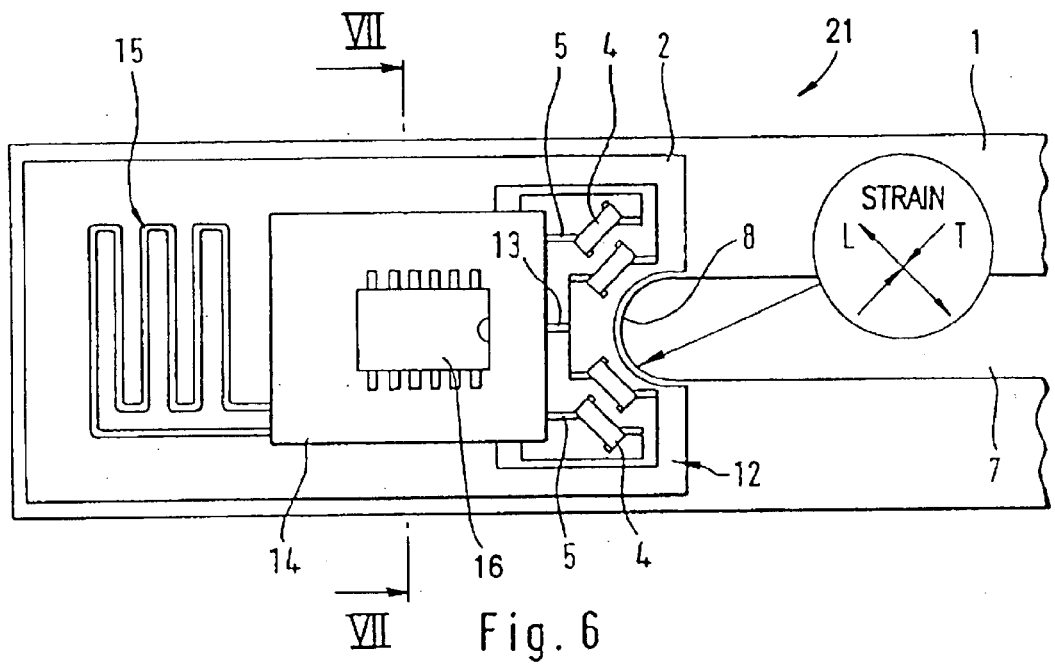
FIG. 6 is a schematic view of another embodiment of the torque sensor according to the present invention.

Identical features are identified by identical reference symbols.

FIG. 1 shows the strain-gage torque sensor 20 according to the invention in schematic form. The sensor has a resistance measuring badge which comprises tour identically conducted strain-sensitive resistors 4 interlinked electrically by conductor tracks 3. The entire extent of this resistance bridge is arranged on a dielectric 2, which in turn rests directly on a support 1.

FIG. 2 shows a section through one of the strain-sensitive resistors 4. A dielectric 2 is applied to a support 1, which is cube-like and consists of steel. Arranged on the dielectric 2 is a conductor track 3 having contact areas 5 to connect the resistor 4 electrically to other circuit parts. The electric resister 4 is in turn arranged son the conductor track 3. The termination is provided by a passivation layer 6, which leaves only the contact areas 5 uncovered. In this case, the support 1 is a shaft, on which the surface strain arising from mechanical loading is picked off the shaft directly by means of the strain sensitive resistors 4. The strain gage described is produced directly on the support 1 using thick-layer technology, and in the present case the support 1 is identical with the component stressed by torsion, for example a shaft.

FIG. 3a shows a plan view of a rectangular surface 9 of the shaft 1. Centrally along its longitudinal extent, the shaft 1 has a slot 7 which passes completely through the shaft 1. At its ends, the slot 7 has radial areas 8 in which, in the event of a torsion acting on the shaft 1, two main stresses of unequal magnitude occur on the surface 9 of the shaft 1 along the mid-line M illustrated, and from the point of view of the resistor 4 these correspond to a longitudinal strain L and a transverse strain T.

This effect is utilized in order to generate a signal which is picked up at the contact areas 5 from the bridge comprising the four strain gages (see FIG. 1).

The common dielectric 2 for all the measuring resistors 4 is matched to the radial area 8 of the slot 7.

In the case of a shaft having a rectangular cross section without any geometrical changes, the two main stresses at 45° to the shaft on the surface 9 are utilized. The thick-layer resistance pastes have positive K factors for the longitudinal and transverse strain. The effective resistance change is determined from the difference between the K factors:

$$\frac{\Delta R}{R} = \varepsilon_L \cdot K_L + \varepsilon_T \cdot K_T \text{ where } \varepsilon_L = -\varepsilon_T$$

This results in $K_{Effective} = \varepsilon \cdot (K_L - K_T)$
(Here, $K_L$ is the K factor for the longitudinal strain.
$K_T$ is the K factor for the transverse strain
$\varepsilon$ is the strain
In the rectangular shaft 1 described (FIG. 3b), because of the slot 7, the strain gage is arranged in the way described in the radial area 8 of the slot 7. As a result, the mechanical stresses acting on the surface, for example torsion and flexure, are superimposed. The resulting main strains in this case do not have the same magnitude but a ratio between longitudinal and transverse strain of, for example, 1: –0.3.

$$K_{Effective} = \varepsilon \cdot (Y \cdot K_L - X \cdot K_T), \text{ where } X=0.3 \text{ and } Y=1.$$

FIG. 4 shows an embodiment of the shaft 1' in which a semicircular recess 7' is made in each longitudinal edge. The resistors 4 are arranged in the radial areas 8 of this semicircular recess 7', as explained in connection with FIG. 3. A section along the mid-line M, in which the two opposite semicircular recesses 7' are at the smallest distance from each other, remains free of resistors.

Both the shaft 1 illustrated in FIG. 3 and the shaft 1' illustrated in FIG. 4 permit the redundant arrangement of two resistance areas, for example one resistance bridge in each case in each radial area 8 of the slot 7.

On the basis of this simple mechanical arrangement, a signal increase over the prior art arrangement of up to more than 300% can be achieved, depending on the thick-layer resistance paste used.

In order to produce an intimate connection between the dielectric 2 and the support 1, in a first design the dielectric 2 is applied to the shaft 1 by means of a nonconductive paste using a printing technique. In this case, the paste contains a glass frit which can be sintered at a lower temperature than the material of the shaft 1. After the paste has been applied, a conductive layer is applied, likewise using a screen-printing technique, and forms the conductor track 3 and the contact areas 5, on which in turn the resistance layer forming the resistors 4 is arranged.

The shaft 1 prepared in this way is heat-treated in a high-temperature process at a temperature of approximately 750° to 900° C. In the process, the glass layer is sintered to the surface of the steel of the shaft 1. During this sintering-on process, oxide bridges are formed between the dielectric 2 and the shaft 1 and ensure a nondetachable connection between the shaft 1 and dielectric 2.

This rigid, intimate connection produces a lower strain hysteresis as compared with the adhesive bonding technique.

An alternative to the insulating layer 2 can also be applied as a flexible film layer. In this case, in a first step the conductor track 3 and the contact areas 5, as well as the resistors 4, are applied to the film-like dielectric 2 in a manner already known. The film-like dielectric is then placed onto the shaft 1. The area 8' of the film-like insulating layer 2 that is matched to the radial area 8 of the slot 7 is in this case used as an adjustment aid, in order that the strain-sensitive resistors 4 can be arranged in that area of the shaft 1 in which the greatest differences occur between the lateral and transverse strain forces when the shaft 1 is subjected to torsion.

The above-described film-like dielectric 2 comprises a synthetic resin with a glass frit, on which the pattern of the resistor 4 is applied by means of a screen printing technique. In the screen printing technique, the conductor track 3 with the contact areas 5, and the measuring resistor 4 and then the passivation layer 6 are applied one after another. Resistor 4 and conductor track 3 are conductive pastes, which contain conductive particles and glass frits. During a high-temperature process at about 850° C., all the layers are sintered onto the shaft 1 and the plastic contained in the dielectric 2 is gasified without any residues. Here, too, the production of oxide bridges between shaft 1 and dielectric 2 produces a durable connection between the two. After the sintering process, the structures of insulating and conductive layers remain on the shaft 1.

FIG. 5 illustrates an arrangement for a strain-sensitive resistor which is produced separately from the actual support element, i.e., the shaft 1, and subsequently applied to this shaft 1.

A nonconductive paste is printed onto a support sheet 10, which may comprise a commercially available waxed paper, for example, using the screen printing process and is dried. The paste contains a glass frit which can be sintered at a lower temperature than the material of the shaft 1. After the paste has been dried, the conductor track 3 is likewise printed on by screen printing and dried . Then in order to produce the resistance layer 4, a conductive paste containing platinum particles is printed onto the conductor-track layer 3. After this resistance layer 4 has been dried, the entire structure comprising dielectric 2, conductor track 3 and resistor 4 is completely covered with a flexible synthetic resin layer 11, which acts as a film. At its edges this film it adheres to the support sheet 10.

This prepared arrangement is then removed from the support sheet 10 using the principle of a transfer, in that the flexible film layer 11 is used as a transport aid for the dielectric 2, the conductor track 3, and the resistor 4, Since the adhesion of the dielectric 2 to the support sheet 10 is significantly lower than to the flexible film layer 11, when the support sheet 10 and the flexible film layer 11 are separated, the entire resistor structure and the dielectric 2 always remains on the film layer 11.

This film layer 11 is placed onto the shaft 1 in such a way that the radial area of the dielectric 2 is made to coincide with the radial area 8 of the slot 7. In the process, the dielectric 2 comes into direct contact with the shaft 1. Since the film layer 11 that projects beyond the dielectric 2 has adhesive properties, the above-described arrangement remains in its position applied to the shaft 1.

Before the structure in rig. 5 is applied to the shaft 1, the steel is wetted with an adhesion promoter in order to fix the dielectric 2 on the shaft 1 better.

During the subsequent high-temperature process, the flexible film layer 11 is burned or gasified at a temperature of approximately 300° C. When the temperature is further increased to approximately 700° to 900° C., the glass layer of the dielectric 2 is sintered to the surface of the shaft 1. During this sintering-on process, oxide bridges are formed between the dielectric 2 and the shaft 1 and ensure a direct connection between shaft 1 and dielectric 2.

After the flexible film layer 11 has been gasified without any residues, the dielectric 2, the conductor tracks 3, and the resistors 4 remain on the shaft 1 in the form of insulating, conductor-track and resistance layers.

As a result of the support sheet 10, the arrangement is very practical to handle, since there is no risk of inadvertent bonding of the flexible film layer 11 before the support sheet 10 is pulled off.

FIG. 6 shows a thick-layer torque sensor 21 having the strain gages just explained, which is used in auxiliary-force devices in motor vehicles, in particular in electrical or electrohydraulic power steering systems.

The shaft 1 to be loaded has a parallel piped configuration. Arranged on the shaft 1, in the manner described above, is a dielectric 2 on which a resistance measuring bridge 12 is applied by means of the measuring resistors 4 acting as strain gages. The resistance measuring bridge 12 comprises, in a known manner, four resistors 4 which are connected via conductor tracks 3 to electric contact areas 5.

As can be seen from FIG. 6, the resistance measuring bridge 12 which is applied by a thick-layer technique, is connected to the evaluation electronics 14 via a conductor track 13, likewise produced by a thick-layer technique. The evaluation electronics 11 comprise discrete components 16, which are connected to the resistance measuring bridge 12 at the contact areas 5. These evaluation electronics 14 can be arranged separately or else, as in the present case, directly on the shaft 1, where they are soldered to the contact areas 5.

In order to transmit the sensor signal without contact, a coil 15, likewise made of a conductor track produced in a thick-layer technique and contact areas, is formed on the shaft 1 and connected to the evaluation electronics 14. Alternatively, the coil can also be constructed using a conventional technique (winding).

The possibility of printing the coil 15 on using a thick-layer technique means that external soldered connections can be dispensed with. In this case, contact is advantageously made with the evaluation electronics 14 at the contact areas 5 by means of a surface-mounted device technique. This produces a an embodiment, which comprises the sensor element and the electronics and can be set up directly on the shaft 1. Such a sensor can be potted with plastic, for example silicone.

By means of such a sensor, measuring the surface strain on the shaft 1, in the case of use in power steering systems, direct drive from the wheel to the drive is ensured, without additional elasticity in the steering shaft.

Figure 7:
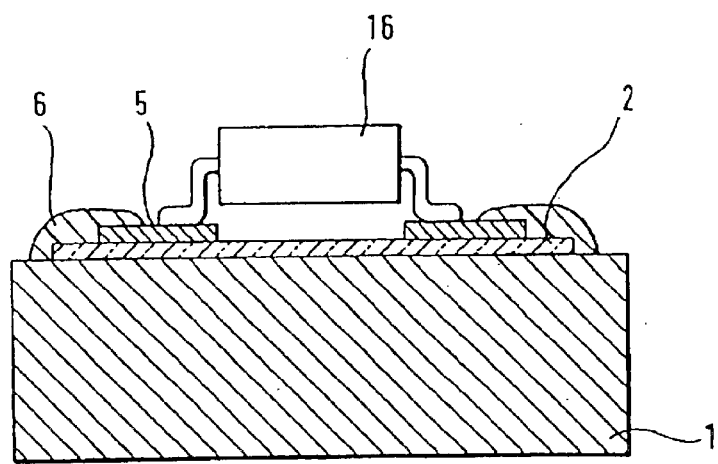
FIG. 7 is a sectional view of the torque sensor along line VII—VII in FIG. 6.

FIG. 7 illustrates the torque sensor embodiment according to the invention in section. Discrete components 15 from the evaluation circuit 14 are soldered onto the contact areas 5 not covered by the passivation layer 6.

What is claimed is:

1. A method of producing a strain-sensitive resistor arrangement, comprising the steps of:
   (a) applying an insulating layer to the first side of the support sheet and applying a resistive layer onto the insulating layer after the insulating layer has been applied to said support sheet, wherein the insulating layer is printed onto the support element in the form of a glass frit, the glass frit is dried, and a conductive paste is applied onto the insulating layer as the resistive layer;
   (b) matching an area of a flexible film layer to a shape of a recess defined in a surface of a support element;
   (c) covering the first side of the first support sheet, the insulating layer, and the resistive layer with the flexible film layer such that the flexible film covers the insulating layer and the resistive layer, wherein an adhesion of the flexible film layer to the at least one of the insulating layer and the resistive layer is greater than an adhesion of the first support sheet to the at least one of the insulating layer and the resistive layer;
   (d) removing the support sheet from the insulating layer and the resistive layer such that at least the resistive layer remains on the flexible film layer and applying the flexible film layer with at least the resistive layer to the surface of the support element so that the area of the flexible film layer matching the shape of the recess defined in the surface is congruent with the shape of the recess defined in the surface; and
   (e) subjecting the support element to a heat treatment after said step (d) to burn off the flexible film layer and sinter on the at least one of the insulating layer and the resistive layer.

2. A method of producing a strain-sensitive resistor arrangement, comprising the steps of:
   (a) printing an insulating layer on a first side of a first support sheet and printing a resistive layer on a first side of a second support sheet;
   (b) matching an area of first and second flexible film layers to a shape of a recess defined in a surface of a support element;
   (c) covering the first side of the first support sheet and the insulating layer with the first flexible film layer, wherein an adhesion of the flexible film layer to the insulating layer is greater than an adhesion of the first support sheet to the insulating layer and covering the first side of the second support sheet and the resistive layer with the second flexible film layer, wherein an adhesion of the flexible film layer to the resistive layer is greater than an adhesion of the second support sheet to the resistive layer;
   (d) removing the first support sheet from the insulating layer such that the insulating layer remains on the flexible film layer and applying the flexible film layer with the insulating layer to the surface of the support element so that the area of the flexible film layer matching the shape of the recess defined in the surface is congruent with the shape of the recess defined in the surface and so that the insulating layer is applied to the support element; and
   (e) subjecting the support element to heat treatment after step (d) to burn off the first flexible film layer and sinter on the insulating layer;

(f) removing the second support sheet from the resistive layer such that the resistive layer remains on the second flexible film layer and arranging the resistive layer on the insulating layer after said step (e); and (g) heat-treating the resistive layer for sintering the resistive layer on the insulating layer.

* * * * *